United States Patent Office 3,546,158
Patented Dec. 8, 1970

3,546,158
FLOORING COMPOSITION
William C. Champion, Jr., Flemington, and Elliott Farber, Trenton, N.J., assignors to Tenneco Chemicals, Inc., a corporation of Delaware
No Drawing. Filed Aug. 1, 1968, Ser. No. 749,313
Int. Cl. C08k 1/14
U.S. Cl. 260—41      7 Claims

ABSTRACT OF THE DISCLOSURE

A flooring composition that is characterized by excellent processing characteristics, good heat stability and other valuable properties comprises (a) a terpolymer prepared from a monomer mixture containing from 65% to 95% by weight of vinyl chloride, from 4% to 25% by weight of a vinyl ester of a lower alkanoic acid, and from 1% to 10% by weight of an α-olefin having 10 to 22 carbon atoms and (b) 50%–80%, based on the weight of the composition, of a fibrous filler and/or a non-fibrous filler.

---

This invention relates to flooring compositions. More particularly, it relates to compositions that comprise certain vinyl chloride terpolymers and fillers and that are especially adapted for use as flooring compositions.

Vinyl chloride polymers have properties which make them desirable materials for use in a wide variety of applications. For example, their excellent abrasion resistance, high gloss, and good resistance to water and to alkalies has resulted in their use in floor coverings, wall coverings, shoe soles and heels, and the like. The vinyl chloride resins are commonly fabricated into these useful articles by the application of heat in milling, calendering, or molding operations. The use of vinyl chloride homopolymers in these applications is limited, however, by the tendency of the polymers to degrade under the influence of heat and shearing action during processing. The use of a vinyl alkanoate as a comonomer in the production of vinyl chloride polymers improves the processing characteristics of the polymer, but has an adverse effect on the resistance of the polymer to thermal degradation.

In accordance with this invention, it has been found that when certain vinyl chloride terpolymers are used in place of vinyl chloride-vinyl acetate copolymers in the preparation of compositions that are suitable for use as floor coverings, the processability of the compositions and their thermal stability are substantially improved. When these vinyl chloride terpolymers are used in flooring compositions, the concentration of the filler component in the compositions can be increased without having a detrimental effect on the processing characteristics and other properties of the compositions. This increase in the concentration of the filler can result in a significant reduction in the cost of the product.

The vinyl chloride terpolymers that can be used to improve the processability, thermal stability, and other properties of vinyl chloride flooring compositions are prepared from monomer mixtures that contain from 65 percent to 95 percent by weight of vinyl chloride, 4 percent to 25 percent by weight of a vinyl ester of a lower alkanoic acid, and 1 percent to 10 percent by weight of an α-olefin having from 10 to 22 carbon atoms. The vinyl esters that can be used in the preparation of the terpolymers are vinyl esters of alkanoic acids that have from 1 to 6 carbon atoms. These include, for example, vinyl formate, vinyl acetate, vinyl butyrate, vinyl caproate, and mixtures thereof. Vinyl acetate is ordinarily preferred because of its availability and low cost. The α-olefins that can be used are those that contain from 10 to 22 carbon atoms, such as decene-1, dodecene-1, tetradecene-1, hexadecene-1, octadecene-1, eicosene-1, docosene-1, and mixtures thereof. Particularly satisfactory results have been obtained using terpolymers prepared from monomer mixtures that contain from 80 percent to 93 percent by weight of vinyl chloride, 5 percent to 15 percent by weight of vinyl acetate, and 2 percent to 5 percent by weight of hexadecene-1 or octadecene-1.

These terpolymers may be prepared by any of the well-known emulsion or suspension polymerization procedures. For example, they may be prepared by a suspension polymerization process in which the monomers are dispersed as small droplets in water and polymerized therein. The polymerization is generally carried out at a temperature in the range of 30° C. to 70° C. in the presence of about 0.005% to 2%, based on the weight of the monomers, of a free radical generating polymerization initiator, such as lauroyl peroxide, benzoyl peroxide, diisopropylperoxy dicarbonate, tertiary butyl peroxypivalate, azobisisobutyronitrile, and the like. A small amount of a suspending or dispersing agent, such as methylcellulose, gelatin, hydrolyzed polyvinyl acetate, and the like, may also be present during the polymerization. The polymers may be dried by spray-, drum-, or tray-drying techniques or by any other known techniques for drying polymeric materials.

The flooring compositions of this invention contain about 50 percent to 80 percent by weight of filler material. The filler component usually contains both fibrous and non-fibrous fillers, but either type can be used alone for some purposes. The filler component preferably contains about 1 part to 2 parts by weight of a non-fibrous filler per part by weight of a fibrous filler.

The fibrous fillers that can be used include, for example, asbestos, mineral wool, cork, wood flour, cellulose fibers, and the like. Asbestos is the most commonly used and the preferred fibrous filler. Any of the commercially available grades of asbestos that are used in the preparation of flooring compositions can be used in the compsitions of this invention.

Suitable non-fibrous fillers include calcium carbonate, calcium sulfate, calcium silicate, barium carbonate, barium sulfate, silica, china clay, kaolin, fuller's earth, talc, titanium dioxide, iron oxide, lead chromate, carbon black, and the like. While a single non-fibrous filler may be used, a mixture of two or more of these fillers that includes at least one pigment is generally preferred.

In addition to the terpolymers and the fillers, the compositions of this invention may also contain plasticizers, stabilizers, lubricants, resins, solvents, dyes, and other additives in the amounts ordinarily used for these purposes.

Any of the plasticizers that are commonly used in vinyl halide resin compositions can be used in the compositions of this invention. These include, for example, dioctyl phthalate, diisodecyl phthalate, butyl benzyl phthalate, dibutyl sebacate, tricresyl phosphate, polyesters, epoxidized vegetable oils, and the like. The plasticizers are generally used in the amount of from 1 percent to 10 percent of the weight of the composition.

The choice of thermal stabilizer for the composition is dependent to a large extent upon the choice of the filler materials. When the filler component contains a sizeable proportion of asbestos, melamine, dicyandiamide, guanidine, benzoguanamine, phthalic anhydride, dodecenylsuccinic anhydride, and mixtures thereof are among the stabilizers that can be used. When no asbestos or a small amount of asbestos is present, the preferred stabilizers include metal soaps, such as the barium, cadmium, and zinc salts of fatty acids, benzoic acid, or p-tertiary butylbenzoic acid; metal phenates, such as the barium cadmium, and zinc salts of phenol or alkylphenols; organotin compounds; organic phosphites, such as triphenyl phosphite, diphenyl decyl phosphite, and isooctyl di-tert.-octylphenyl phosphite; polyhydric alcohols; such as sorbitol and pentaerythritol; and mixtures thereof. In most cases 0.2 percent to 3 percent, based on the weight of the composition, of one or more of the stabilizing compounds is used.

The compositions of this invention may be prepared by and suitable and convenient procedure. For example, the terpolymer, fillers, plasticizer, stabilizers, and other ingredients may be blended with or without the aid of a volatile solvent and the resulting composition milled on rolls at 200° F. to 350° F. until it is homogeneous. The resinous composition may then be removed from the mill in the form of a film or sheet of the desired thickness which may be used as such as subjected to a polishing or embossing treatment.

The invention is further illustrated by the examples that follow. In these examples all parts and percentages are parts by weight and percentages by weight.

EXAMPLE 1

A series of vinyl chloride compositions was prepared by mixing the materials listed in Table I in a Hobart blender for 15 minutes. The following vinyl chloride polymers were used in the preparation of these compositions:

Polymer A: Percent
  Vinyl chloride _____ 87.5
  Vinyl acetate _____ 10.0
  Octadecene-1 _____ 2.5
Polymer B:
  Vinyl chloride _____ 89.0
  Vinyl acetate _____ 8.5
  Octadecene-1 _____ 2.5
Comparative polymer:
  Vinyl chloride _____ 86.0
  Vinyl acetate _____ 14.0

One hundred gram portions of each of the compositions were worked in a Brabender Plasti-Corder Type VI roller head maintained at a jacket temperature of 250° F. and a rotor speed of 30 r.p.m. to determine their processing characteristics. The results of the testing are summarized in Table I.

TABLE I

| | Ex. No. 1A | Ex. No. 1B | Ex. No. 1C |
|---|---|---|---|
| Composition (parts): | | | |
| Polymer A | 100 | | |
| Polymer B | | 100 | |
| Comparative polymer | | | 100 |
| Calcium carbonate | 300 | 300 | 300 |
| Talc | 100 | 100 | 100 |
| Butyl benzyl phthalate | 30 | 30 | 30 |
| Epoxidized soybean oil | 3 | 3 | 3 |
| Barium-cadmium laurate stabilizer (Nuostabe V-133) | 2 | 2 | 2 |
| Stearic acid | 2 | 2 | 2 |
| Processing Characteristics: | | | |
| Maximum fusion torque (meter grams) | 4,100 | 3,600 | 6,000 |
| Torque (meter grams) at 5 minutes | 2,250 | 2,100 | 2,300 |
| Torque (meter grams) at 10 minutes | 2,050 | 1,950 | 2,100 |
| Torque (meter grams) at 20 minutes | 2,000 | 1,900 | 2,100 |
| Temperature (° F.) at 20 minutes | 261 | 262 | 264 |

The torque values, which are proportional to melt viscosities, indicate that the compositions of Ex. No. 1A and Ex. No. 1B are easier to process than is the composition of Ex. No. 1C, which contained the vinyl chloride-vinyl acetate copolymer.

EXAMPLE 2

A series of vinyl chloride compositions was prepared by mixing the materials listed in Table II in a Hobart blender for 15 minutes. Polymer A and the Comparative polymer, whose compositions are given in Example 1, were used in the preparation of these vinyl chloride compositions.

One hundred gram portions of each of the compositions were worked in a Brabender Plasti-Corder Type VI roller head maintained at a jacket temperature of 260° F. and a rotor speed of 30 r.p.m. to determine their processing characteristics. The results of the testing are summarized in Table II.

TABLE II

| | Ex. No. 2A | Ex. No. 2B | Ex. No. 2C |
|---|---|---|---|
| Composition (parts): | | | |
| Polymer A | 100 | 90 | |
| Comparative polymer | | | 100 |
| Calcium carbonate | 300 | 300 | 300 |
| Talc | 100 | 100 | 100 |
| Butyl benzyl phthalate | 30 | 27 | 30 |
| Epoxidized soybean oil | 3 | 3 | 3 |
| Barium-cadmium laurate stabilizer (Nuostabe V-133) | 2 | 2 | 2 |
| Stearic acid | 2 | 2 | 2 |
| Processing characteristics: | | | |
| Maximum Fusion Torque (meter-grams) | 4,000 | 3,700 | 4,800 |
| Torque (meter-grams) at 5 minutes | 2,325 | 2,325 | 2,400 |
| Torque (meter-grams) at 10 minutes | 2,150 | 2,175 | 2,200 |
| Torque (meter-grams) at 20 minutes | 2,100 | 2,150 | 2,175 |
| Temperature (° F.) at 20 minutes | 266 | 267 | 267 |

From the data in Table II, it will be seen that the concentration of binder (polymer plus butyl benzyl phthalate) in the composition can be reduced by 10 percent (Ex. No. 2A vs. Ex. No. 2B) while maintaining processing characteristics that are superior to those of the composition containing the Comparative Polymer (Ex. No. 2C).

EXAMPLE 3

A series of vinyl chloride compositions was prepared by mixing the materials listed in Table III in a Hobart blender for 15 minutes. Polymer A, Polymer B, and the Comparative polymer whose compositions are given in Example 1, were used in the preparation of these vinyl chloride compositions.

Ninety gram portions of each of the compositions were worked in a Brabender Plasti-Corder Type VI roller head maintained at a jacket temperature of 250° F. and a rotor speed of 30 r.p.m. to determine their processing characteristics. The results of the testing are summarized in Table III.

TABLE III

| | Ex. No. 3A | Ex. No. 3B | Ex. No. 3C |
|---|---|---|---|
| Composition (parts): | | | |
| Polymer A | 100 | | |
| Polymer B | | 100 | |
| Comparative polymer | | | 100 |
| Limestone (40-mesh) | 250 | 250 | 250 |
| Asbestos (7-TS) | 150 | 150 | 150 |
| Butyl benzyl phthalate | 30 | 30 | 30 |
| Epoxidized soybean oil | 4 | 4 | 4 |
| Dicyandiamide | 2.5 | 2.5 | 2.5 |
| Titanium dioxide | 7 | 7 | 7 |
| Processing characteristics: | | | |
| Maximum Fusion Torque (meter-grams) | 6,500 | 6,250 | 7,400 |
| Torque (meter-grams) at 5 minutes | 2,750 | 2,600 | 2,850 |
| Torque (meter-grams) at 10 minutes | 2,450 | 2,450 | 2,600 |
| Torque (meter-grams) at 20 minutes | 2,400 | 2,450 | 2,500 |
| Temperature (° F.) at 20 minutes | 268 | 271 | 269 |

EXAMPLE 4

Samples of the asbestos-filled compositions whose preparation was described in Example 3 were processed for 5 minutes on a two-roll mill with one roll maintained at 200° F. and the other at 300° F. Smooth sheets of 100 mils thickness were removed from the mill and evaluated by standard test methods. The results obtained are summarized in Table IV.

TABLE IV

| | Ex. No. 4A | Ex. No. 4B |
|---|---|---|
| Composition tested | (1) | (2) |
| Water absorption, percent | 0.69 | 0.74 |
| McBurney Identation (mils) at: | | |
| 1 minute | 10.5 | 11.1 |
| 10 minutes | 13.5 | 14.5 |

[1] Composition of Ex. No. 3A.
[2] Composition of Ex. No. 3C.

From the data in Tables III and IV it will be seen that the asbestos-filled compositions of this invention have better processing characteristics, better water resistance, and better resistance to deformation than do those containing a vinyl chloride-vinyl acetate copolymer.

The terms and expressions which have been employed have been used as terms of description and not of limitation. There is no intention in the use of such terms and expressions of excluding any equivalents of the features shown and described or portions thereof; it is to be recognized that various modifications are possible within the scope of the invention claimed.

What is claimed is:

1. A flooring composition comprising (a) a terpolymer prepared from a monomer mixture containing from 65 percent to 95 percent by weight of vinyl chloride, from 4 percent to 25 percent by weight of a vinyl ester of an alkanoic acid having from 1 to 6 carbon atoms, and from 1 percent to 10 percent by weight of an $\alpha$-olefin having from 10 to 22 carbon atoms and (b) 50 percent to 80 percent, based on the weight of the composition, of a fibrous filler selected from the group consisting of asbestos, mineral wool, cork, wood flour and cellulose fibers, nonfibrous fillers selected from the group consisting of calcium carbonate, calcium sulfate, calcium silicate, barium carbonate, barium sulfate, silica, china clay, kaolin, fuller's earth, talc, titanium dioxide, iron oxide lead chromate and carbon black, and mixtures thereof.

2. A flooring composition as set forth in claim 1 wherein the terpolymer is prepared from a monomer mixture that contains from 80 percent to 93 percent by weight of vinyl chloride, from 5 percent to 15 percent by weight of vinyl acetate, and from 2 percent to 5 percent by weight of octadecene-1.

3. A flooring composition as set forth in claim 1 wherein the terpolymer is prepared from a monomer mixture that contains from 80 percent to 93 percent by weight of vinyl chloride, from 5 percent to 15 percent by weight of vinyl acetate, and from 2 percent to 5 percent by weight of hexadecene-1.

4. A flooring composition as set forth in claim 1 wherein the filler component comprises calcium carbonate.

5. A flooring composition as set forth in claim 1 wherein the filler component contains from 1 part to 2 parts by weight of a non-fibrous filler selected from the group consisting of calcium carbonate, calcium silicate, barium carbonate, barium sulfate, silicon dioxide, talc and mixtures thereof, per part by weight of a fibrous filler selected from the group consisting of asbestos, mineral wool, cork, wood flour and cellulose fibers.

6. A flooring composition as set forth in claim 5 wherein the fibrous filler is asbestos.

7. A flooring composition as set forth in claim 5 wherein the filler component comprises asebestos and calcium carbonate.

References Cited

UNITED STATES PATENTS 2,899,398   8/1959   Pflaumer _____ 260—23

MORRIS LIEBMAN, Primary Examiner

T. MORRIS, Assistant Examiner

U.S. Cl. X.R.
260—29.6, 80.81